US012802849B2

(12) United States Patent
Yamashita et al.

(10) Patent No.: US 12,802,849 B2
(45) **Date of Patent: *Nov. 17, 2026**

(54) ELEMENT BODY, CORE, AND ELECTRONIC COMPONENT

(71) Applicant: TDK CORPORATION, Tokyo (JP)

(72) Inventors: Yasuhide Yamashita, Tokyo (JP); Kotaro Terao, Tokyo (JP); Shinsuke Hashimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/242,494

(22) Filed: Apr. 28, 2021

(65) Prior Publication Data

US 2021/0391112 A1 Dec. 16, 2021

(30) Foreign Application Priority Data

Apr. 28, 2020 (JP) ................................ 2020-079618

(51) Int. Cl.
*H01F 3/08* (2006.01)
*B22F 1/05* (2022.01)
(Continued)

(52) U.S. Cl.
CPC .................. *H01F 3/08* (2013.01); *B22F 1/16* (2022.01); *H01F 1/24* (2013.01); *H01F 27/255* (2013.01); *B22F 1/05* (2022.01)

(58) Field of Classification Search
CPC ..... H01F 1/24; H01F 1/26; H01F 1/33; H01F 1/37; H01F 27/255; H01F 3/08
See application file for complete search history.

(56) References Cited

U.S. PATENT DOCUMENTS

| | | | | |
|---|---|---|---|---|
| 11,183,321 | B2 * | 11/2021 | Ikeda | H01F 1/33 |
| 2003/0134152 | A1 * | 7/2003 | Hayashi | B82Y 30/00 428/842.6 |

(Continued)

FOREIGN PATENT DOCUMENTS

| | | | |
|---|---|---|---|
| CN | 107658090 | A | 2/2018 |
| JP | 2009-010180 | A | 1/2009 |

(Continued)

OTHER PUBLICATIONS

English Machine Translation: Nakazawa (JP 2018-152557) (Year: 2018).*

(Continued)

*Primary Examiner* — Holly Rickman
*Assistant Examiner* — Linda N Chau
(74) *Attorney, Agent, or Firm* — Oliff PLC

(57) ABSTRACT

An electronic component having excellent DC superimposition characteristic and initial magnetic permeability, a core used for the electronic component, and a element body constituting the core are provided. The element body has magnetic large particles and at least one spacer region, wherein one or more small particles having an average particle size smaller than that of the magnetic large particles exist as spacers to form the spacer region between the large particles in a field of view within a predetermined range where 10 or more and 40 or less of the large particles are observable in a cross section of the element body.

7 Claims, 5 Drawing Sheets

(51) Int. Cl.

| | |
|---|---|
| ***B22F 1/16*** | (2022.01) |
| ***H01F 1/24*** | (2006.01) |
| ***H01F 27/255*** | (2006.01) |

(56) References Cited

U.S. PATENT DOCUMENTS

| | | | | |
|---|---|---|---|---|
| 2012/0038532 | A1* | 2/2012 | Yonetsu | H01Q 17/00 427/127 |
| 2013/0056674 | A1 | 3/2013 | Inagaki et al. | |
| 2013/0228716 | A1 | 9/2013 | Suetsuna et al. | |
| 2014/0319406 | A1 | 10/2014 | Suetsuna et al. | |
| 2015/0002255 | A1 | 1/2015 | Kim et al. | |
| 2016/0155549 | A1 | 6/2016 | Kato et al. | |
| 2018/0025822 | A1 | 1/2018 | Yonezawa et al. | |
| 2019/0096553 | A1 | 3/2019 | Kato et al. | |
| 2019/0131040 | A1 | 5/2019 | Ikeda et al. | |
| 2019/0392978 | A1 | 12/2019 | Matsuura | |
| 2021/0129218 | A1* | 5/2021 | Matsumoto | C23C 16/402 |

FOREIGN PATENT DOCUMENTS

| | | | |
|---|---|---|---|
| JP | 2011-233860 | A | 11/2011 |
| JP | 2017-188678 | A | 10/2017 |
| JP | 2018-152557 | A | 9/2018 |
| JP | 6430556 | B2 | 11/2018 |
| JP | 2019-071417 | A | 5/2019 |
| KR | 10-2015-0002172 | A | 1/2015 |
| KR | 10-2018-0103771 | A | 9/2018 |
| KR | 10-2019-0143804 | A | 12/2019 |

OTHER PUBLICATIONS

English Machine Translation: Kobayashi et al. (JP 2013-138159) (Year: 2013).*
English Machine Translation: CN 1374359 A (Year: 2002).*
English Machine Translation: KR 2019-0143804A (Year: 2019).*

* cited by examiner

ELEMENT BODY, CORE, AND ELECTRONIC COMPONENT

BACKGROUND OF THE INVENTION

Field of the Invention

The present invention relates to an electronic component such as an inductor element, and relates to a core used for the electronic component and an element body constituting the core.

Description of the Related Art

For an electronic component such as an inductor element, a core as an element body obtained by compression molding magnetic particles and a binder is used. In particular, coating with a thickness of approximately 10 nm to 100 nm is performed on surfaces of metal magnetic particles in order to impart a rust prevention property and an insulating property to the metal magnetic particles.

For example, in Patent Literature 1 (JP-A-2017-188678), a phosphate coating layer is formed on surfaces of Fe-based soft magnetic powder particles, and a silica-based insulating film is formed outside the phosphate coating layer.

A soft magnetic powder in Patent Literature 2 (JP-A-2009-10180) includes a powder main body part containing Fe and further containing Al, Si, or the like, a coating film of an oxide of Al, Si, or the like, and a coating film of an oxide of B.

However, there is a problem that the electronic component including the core manufactured by using the magnetic particles including the coating film in the related art has insufficient DC superimposition characteristic and initial magnetic permeability.

SUMMARY OF THE INVENTION

The present invention is made in view of the above circumstance and an object thereof is to provide an electronic component having excellent DC superimposition characteristic and initial magnetic permeability, a core used for the electronic component, and an element body constituting the core.

In order to achieve the above object, an element body according to the present invention has magnetic large particles and at least one spacer region, wherein one or more small particles having an average particle size smaller than that of the large particles exist as spacers to form the spacer region between the large particles in a field of view within a predetermined range where 10 or more and 40 or less of the large particles are observable in a cross section of the element body.

The present inventor has found that an electronic component such as an inductor element including a core made of the element body is excellent in DC superimposition characteristic and initial magnetic permeability since the element body according to the present invention has the above configuration.

Since the element body of the present invention has one or more spacer regions in the field of view within a predetermined range, it is difficult for the large particles to come into contact with each other. Therefore, it is possible to secure a predetermined distance between the large particles, and the distance between the large particles can be set to a certain level or more. It is considered that magnetic field concentration can be prevented and the DC superimposition characteristic can be improved by setting the distance between the large particles to a certain level or more.

In the present invention, the initial magnetic permeability is high. It is considered that this is because a density can be increased while maintaining an insulating property.

The element body according to the present invention preferably has three or more spacer regions in the field of view within the predetermined range.

In the molded product according to the present invention, it is preferable that the small particles have a non-magnetic property and an insulating property.

In the element body according to the present invention, the small particles may be made of at least one selected from the group consisting of titanium oxide, aluminum oxide, magnesium oxide, zinc oxide, bismuth oxide, yttrium oxide, calcium oxide, silicon oxide, and ferrite.

In the element body according to the present invention, the small particles may be $SiO_2$ particles.

The $SiO_2$ particles have an advantage of being inexpensive. In addition, the $SiO_2$ particles have a lineup of particle sizes from several nm to several hundred nm. Further, the $SiO_2$ particles tend to have a narrow particle size distribution, and thus can be uniform spacers between particles.

It is preferable that the element body according to the present invention includes a location where at least part of surfaces of the large particles located between the small particles existing around the large particles is covered with at least a mutual buffer film in the field of view within the predetermined range.

It is considered that since the surfaces of the large particles located between the small particles are covered with the mutual buffer film, the small particles on the surfaces of the large particles can be prevented from moving along the surfaces of the large particles even if a pressure is applied during molding. Therefore, certainty that the small particles function as spacers between the large particles is considered to increase. It is considered that the DC superposition characteristic is further improved since the magnetic field concentration is further prevented by covering the surfaces of the large particles with the mutual buffer film.

In the element body according to the present invention, it is preferable that the mutual buffer film has a non-magnetic property and an insulating property.

In the element body according to the present invention, the mutual buffer film may be obtained by a sol-gel reaction of one of a metal alkoxide precursor and a non-metal alkoxide or a combination thereof.

In the element body according to the present invention, the mutual buffer film may be tetraethoxysilane (TEOS).

In the present invention, a withstand voltage can be further increased by using TEOS as the mutual buffer film. TEOS has an advantage of being low in material cost. Furthermore, by using TEOS as the mutual buffer film, a thickness of the mutual buffer film can be adjusted by temperature, time, or an amount of the TEOS charged.

A core according to the present invention is made of the above-mentioned element body.

An electronic component according to the present invention includes the above-mentioned core.

DETAILED DESCRIPTION OF THE PREFERRED EMBODIMENTS

First Embodiment

<Inductor Element>

Figure 1:
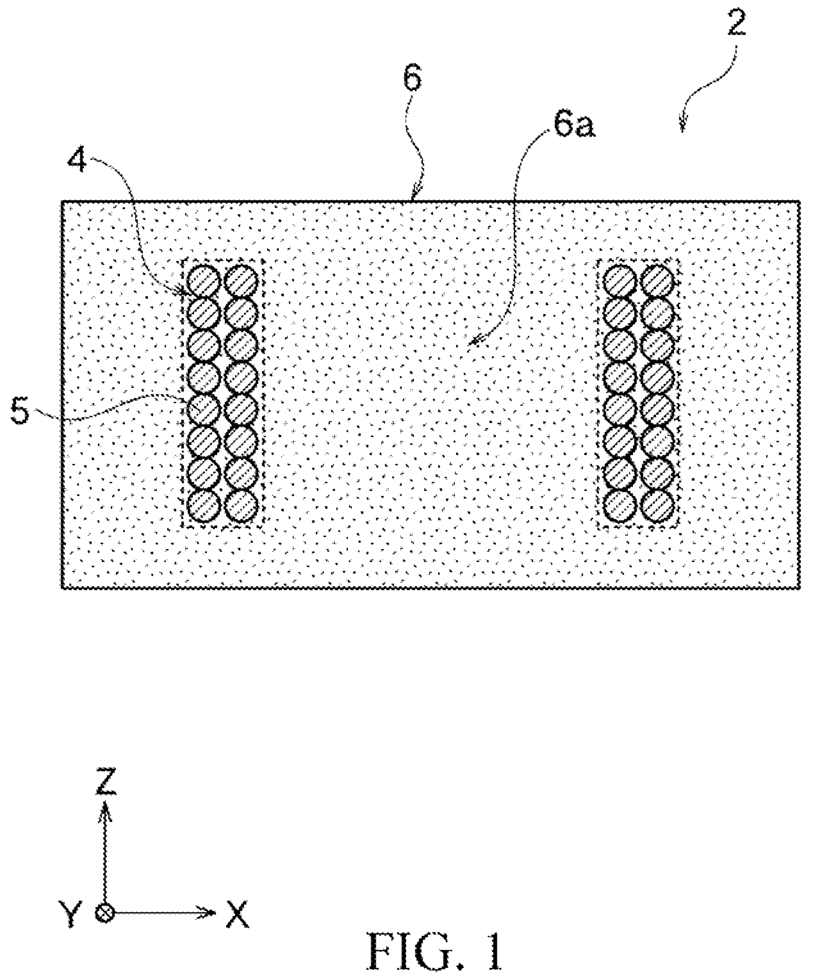
FIG. 1 is a cross-sectional view of an inductor element according to an embodiment of the present invention.

An element body in the present embodiment can be used as a core 6 of an inductor element 2 shown in FIG. 1, for example. As shown in FIG. 1, the inductor element 2 according to the embodiment of the present invention includes a winding portion 4 and the core 6. In the winding portion 4, a conductor 5 is wound in a coil shape. The core 6 is made of particles and a binder.

Figure 2:
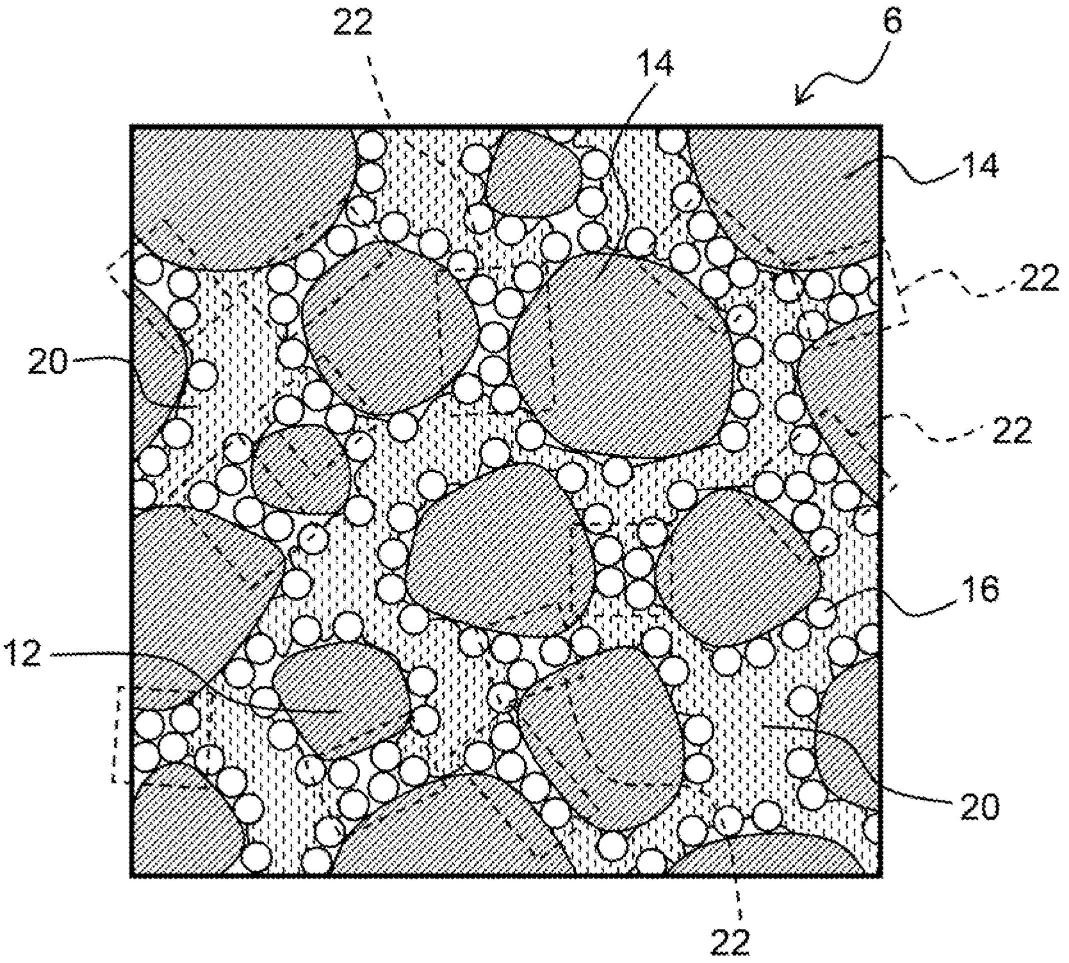
FIG. 2 is a schematic cross-sectional view of a core (element body) according to the embodiment of the present invention.

As shown in FIG. 2, the core 6 is molded by compressing, for example, large particles 14 and a binder 20. Such a core 6 is fixed in a predetermined shape by binding the large particles 14 to each other via the binder 20.

In the present embodiment, a spacer region 22, in which one or more small particles 16 having an average particle size smaller than that of the large particles 14 exist as spacers between the large particles 14, exist. In other words, the spacer region 22 is a region that straddles two large particles 14 and contains one or more small particles 16 that function as the spacers in that region.

"Small particles 16 having an average particle size smaller than that of the large particles 14 exist as spacers between the large particles 14" means that the small particles 16 directly or indirectly attached to a surface of one of two adjacent large particles 14 and also directly or indirectly attached to a surface of the other large particle 14 exist. It may also mean that the small particles 16 directly or indirectly attached to the surface of one of the two adjacent large particles 14 and also directly or indirectly attached to the surface of the other large particle 14 via other small particles 16 exist.

For example, in FIG. 2, in the spacer regions 22 surrounded by dotted lines, the small particles 16 having a particle size smaller than that of the large particles 14 exist as the spacers between the large particles 14.

In the present embodiment, one or more spacer regions 22, preferably three or more spacer regions 22 exist in a field of view within a predetermined range in which 10 or more and 40 or less of the large particles 14 can be observed.

In the present embodiment, the number of the small particles 16 existing as the spacers in the spacer region 22 is preferably 1 or more, and more preferably 4 or more.

In the present embodiment, at least a part of the core 6 (for example, a central portion **6*a* of the core 6) may be made of, for example, a predetermined element body shown in FIG. 2**.

As a resin serving as the binder 20 constituting the core 6, a known resin can be used. Specific examples thereof include an epoxy resin, a phenol resin, a polyimide resin, a polyamideimide resin, a silicone resin, a melamine resin, a urea resin, a furan resin, an alkyd resin, an unsaturated polyester resin, a diallyl phthalate resin, and the like, and an epoxy resin is preferred. The resin serving as the binder 20 constituting the core 6 may be a thermosetting resin or a thermoplastic resin, and is preferably a thermosetting resin.

<Large Particles>

The large particles 14 in the present embodiment are magnetic. The large particles 14 in the present embodiment are preferably metal magnetic particles or ferrite particles, more preferably metal magnetic particles, and still more preferably contain Fe.

Specific examples of the metal magnetic particles containing Fe include particles of pure iron, carbonyl Fe, Fe-based alloys, Fe—Si-based alloys, Fe—Al-based alloys, Fe—Ni-based alloys, Fe—Si—Al-based alloys, Fe—Si—Cr-based alloys, Fe—Co-based alloys, Fe-based amorphous alloys, Fe-based nanocrystal alloys, and the like.

Examples of the ferrite particles include Ni—Cu-based ferrite particles, Ni—Cu—Zn-based ferrite particles, and the like.

In the present embodiment, as the large particles 14, a plurality of large particles 14 made of the same material may be used, or a plurality of large particles 14 made of different materials may be mixed and used. For example, a plurality of Fe-based alloy particles as the large particles 14 and a plurality of Fe—Si-based alloy particles as the large particles 14 may be mixed and used.

An average particle size (R) of the large particles 14 of the present embodiment is preferably 400 nm or more and 100.00 nm or less, and more preferably 3000 nm or more and 30,000 nm or less. The larger the average particle size (R) of the large particles 14, the higher the initial magnetic permeability tends to be.

When the large particles 14 are configured by two or more kinds of large particles 14 made of different materials, the average particle size of the large particles 14 made of one material and the average particle size of the large particles 14 made of another material may be different as long as the two average particle sizes are both within the above range.

Examples of the different materials include a case where elements constituting the metal or the alloy are different, a case where constituent elements are the same but compositions thereof are different, and the like.

<Small Particles>

The small particles 16 in the present embodiment are smaller than the large particles 14. In the present embodiment, when the average particle size of the large particles 14 is R and the average particle size of the small particles 16 attached to the large particles 14 is r, (r/R) is preferably 0.0012 or more and 0.025 or less, and more preferably 0.002 or more and 0.015 or less.

The average particle size (r) of the small particles 16 is preferably 12 nm to 100 nm, and more preferably 12 nm to 60 nm.

In the present embodiment, a material of the small particles 16 is not particularly limited, but preferably has a non-magnetic property and an insulating property. The small particles 16 are more preferably particles made of a metal oxide, such as $SiO_2$ particles, $TiO_2$ particles, $Al_2O_3$ particles, $SnO_2$ particles, MgO particles, $Bi_2O_3$ particles, $Y_2O_3$ particles and/or CaO particles, or particles made of ferrite, and still more preferably $SiO_2$ particles.

In the present embodiment, as the small particles 16, a plurality of small particles 16 made of the same material may be used, or a plurality of small particles 16 made of different materials may be mixed and used.

D90 of the small particles 16 of the present embodiment is preferably smaller than D10 of the large particles 14.

Here, D10 is a particle size of particles whose cumulative frequency is 10% counting from a small particle size side.

The D90 is a particle size of particles whose cumulative frequency is 90% counting from the small particle size side.

A particle size distribution such as D10 or D90 can be measured by a panicle size distribution measuring machine such as a laser diffraction type particle size distribution measuring machine HELOS (Japan Laser Corp.). The D10 of the large particles 14 can be measured by a particle size distribution measuring machine such as the laser diffraction type particle size distribution measuring machine HELOS (Japan Laser Corp.). The D90 of the small particles 16 can be measured by a wet particle size distribution measuring machine Zetasizer Nano ZS (Spectris Co., Ltd.) or the like.

When the small particles 16 are configured by two or more kinds of small particles 16 made of different materials, the average particle size of the small particles 16 made of one material and the average particle size of the small particles 16 made of another material may be different.

As shown in FIG. 2, the core 6 of the present embodiment has the spacer region 22 in which the small particles 16 smaller than the large particles 14 exist as the spacers between the large particles 14. Therefore, a predetermined distance can be created between the large particles 14, and the distance between the large particles 14 can be set to a certain level or more. Therefore, since it is difficult for the large particles 14 to come into contact with each other, it is possible to prevent magnetic field concentration, thereby preventing occurrence of magnetic saturation. Therefore, the DC superimposition characteristic is improved. Here, improving the DC superimposition characteristic means that the magnetic permeability of the core is less likely to decrease due to strength of a magnetic field generated by a current flowing through a coil.

In the present embodiment, as described above, since the small particles 16 smaller than the large particles 14 exist as the spacers between the large particles 14, a high DC superimposition characteristic can be ensured even when molded at a relatively high voltage.

Furthermore, by changing the average particle size of the small particles 16 existing as the spacers, the distance between the large particles 14 can be kept as intended and constant. Therefore, a desired DC superimposition characteristic and a desired initial magnetic permeability can be obtained.

In the present embodiment, since the distance between the large particles 14 is set to a certain level or more by the small particles 16, it is possible to prevent a decrease in withstand voltage in a high temperature environment. For example, the inductor element 2 is required to have a heat resistant temperature of 150° C. or higher to be used for in-vehicle applications. In this regard, as described above, the inductor element 2 including the core 6 made of the element body of the present embodiment can prevent a decrease in withstand voltage even in a high temperature environment. Therefore, the inductor element 2 can be suitably used for the in-vehicle applications requiring a heat resistant temperature of 150° C. or higher.

<Method of Manufacturing Inductor Element and Core>

Figure 3:
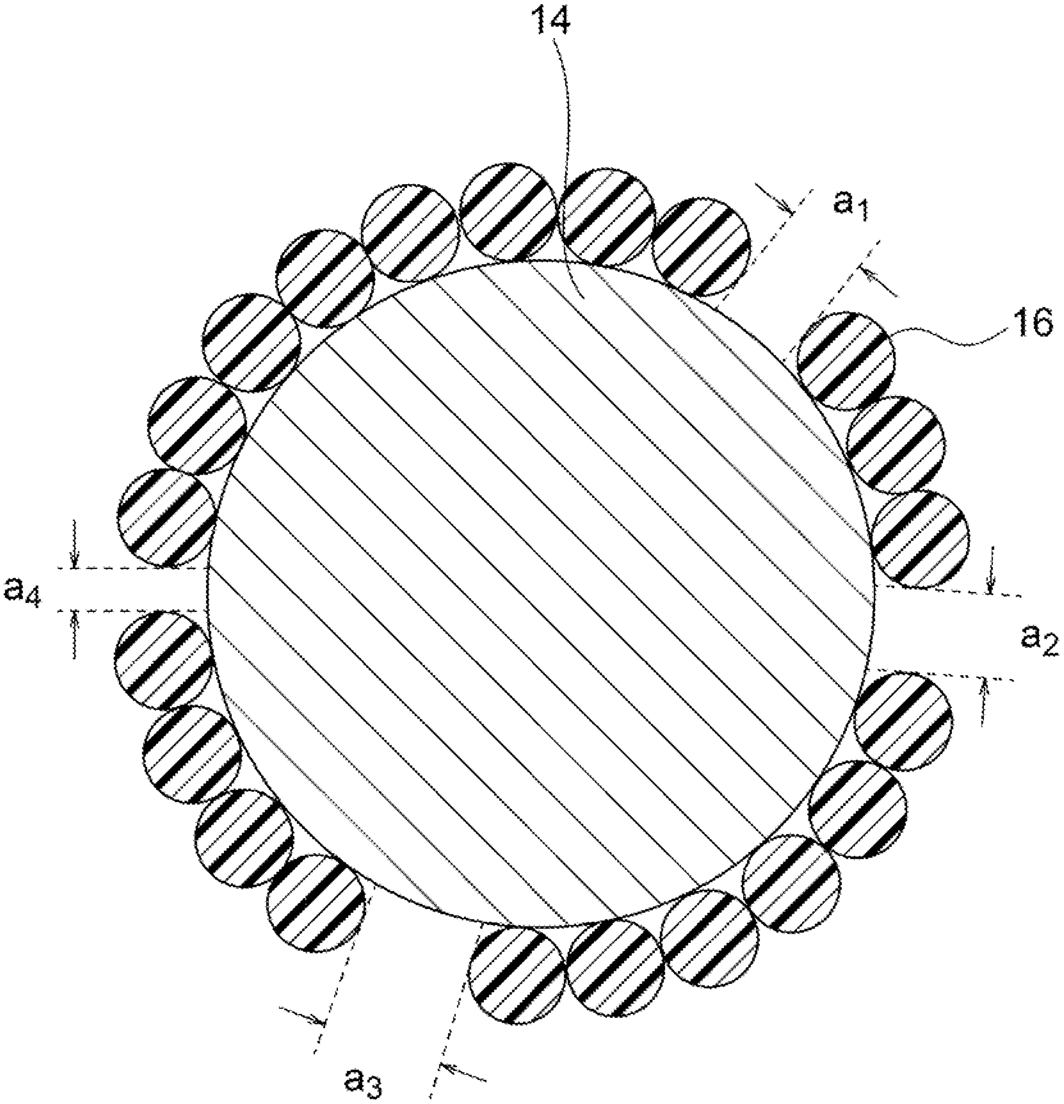
FIG. 3 is a schematic cross-sectional view of composite particles according to the embodiment of the present invention.

The large particles 14 and the small particles 16 are prepared, and as shown in FIG. 3, composite particles 12 in which the small particles 16 are attached to surfaces of the large particles 14 are prepared. A method for attaching the small particles 16 to the surfaces of the large particles 14 is not particularly limited. For example, the small particles 16 may be attached to the surfaces of the large particles 14 by electrostatic adsorption; the small particles 16 may be attached to the surfaces of the large particles 14 by a mechanochemical method; the small particles 16 may be attached to the surfaces of the large particles 14 by a method of precipitating the small particles 16 on the surfaces of the large particles 14 by synthesis; and the small particles 16 may be attached to the large particles 14 via an organic material such as a resin.

In the present embodiment, it is preferable to attach the small particles 16 to the surfaces of the large particles 14 by electrostatic adsorption. This is because, in a case of electrostatic adsorption, it is possible to attach the small particles 16 to the surfaces of the large particles 14 with low energy. Compared with the mechanochemical method, the electrostatic adsorption can attach the small particles 16 to the surfaces of the large particles 14 with low energy, so that distortion of the particles is less likely to occur, and the core loss can be reduced. In the electrostatic adsorption, the large particles 14 and the small particles 16 are charged with opposite charges and then adsorbed, so that there is an advantage that it is easy to control an amount of the small particles 16 attached to the large particles 14.

As shown in FIG. 3, in the composite particles 12 according to the present embodiment, the small particles 16 having the average particle size smaller than the average particle size of the large particles 14 are directly or indirectly attached to the surfaces of the large particles 14. That is, the small particles 16 may be directly attached to the surfaces of the large particles 14, or other small particles 16 may be attached to the surfaces of the large particles 14 via one or more small particles 16.

In a cross section of one composite particle 12, a length of a circumference of one large particle 14 is L, and as shown in FIG. 3, distances between two adjacent small particles 16 on the circumference of the large particle 14 are a1, a2, . . . . In this case, a coverage of the small particles 16 with respect to the large particle 14 is expressed as $\{L-(a1+a2\ldots)\}/L$. In the present embodiment, the coverage of the small particles 16 with respect to the large particle 14 is preferably 20% or more and 100% or less, and more preferably 30% or more and 100% or less.

The number of the small particles 16 attached to the large particle 14 is not particularly limited. When the cross section of the composite particle 12 is observed in an approximately diameter portion of the large particle 14, it is preferable that 6 or more small particles 16 are observed.

In the present embodiment, the core 6 is manufactured using the above-mentioned composite particles 12. As shown in FIG. 1, the above-mentioned composite particles 12 and an air-cored coil formed by winding the conductor (wire) 5 a predetermined number of times are filled in a mold and compression-molded to obtain the element body into which the coil is embedded therein. A compression method is not particularly limited, and the compression may be performed from one direction, or may be isotropically performed by warm isostatic press (WIP), cold isostatic press (CIP), or the like, but is preferably isotropically performed. Therefore, rearrangement and densification of an internal structure of the large particles 14 and the small particles 16 can be achieved.

By heat-treating the obtained molded product, the large particles 14 and the small particles 16 are fixed, and the core 6 having a predetermined shape in which the coil is embedded can be obtained. Such a core 6 functions as a coil-type electronic component such as the inductor element 2 since the coil is embedded therein.

Second Embodiment

Figure 4:
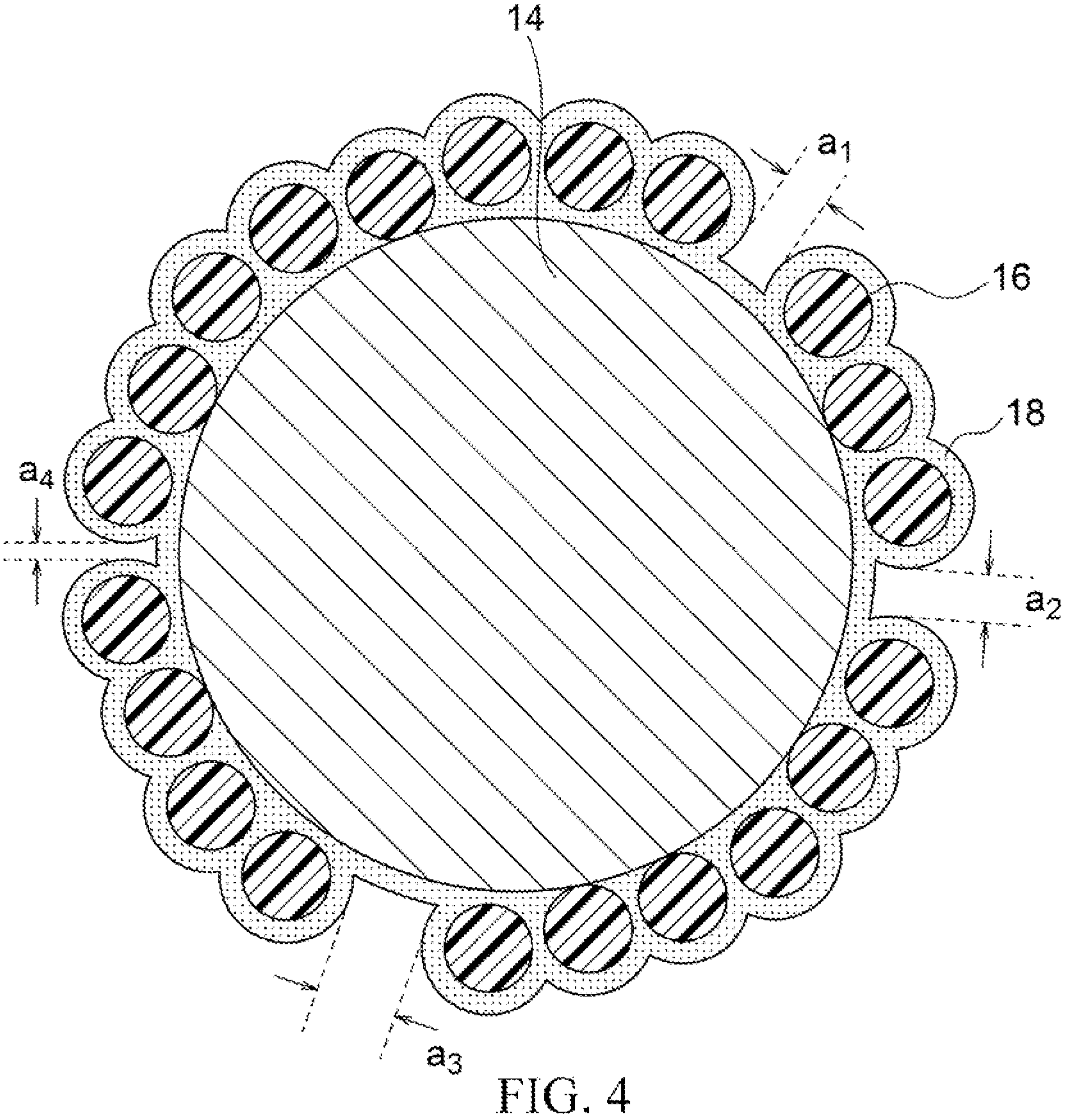
FIG. 4 is a schematic cross-sectional view of composite particles according to another embodiment of the present invention.

The present embodiment is the same as the core 6 of the first embodiment except for that as shown below. In the present embodiment, as shown in FIG. 4, a mutual buffer film 18 covers at least part of the surfaces of the large particles 14 located between the small particles 16 existing around the large particles 14. Preferably, the mutual buffer film 18 also covers surfaces of the small particles 16.

In the present embodiment, when the average particle size of the small particles 16 is r and an average thickness of the mutual buffer film 18 is t, (t/r) is preferably larger than 0 and 0.7 or less, and more preferably 0.1 or more and 0.5 or less.

A material of the mutual buffer film 18 of the present embodiment is not particularly limited, but preferably has a non-magnetic property and an insulating property, and it is more preferable that the mutual buffer film 18 can impart a rust prevention property to the large particles 14. The mutual buffer film 18 of the present embodiment is preferably manufactured by a sol-gel method, and is preferably obtained by a sol-gel reaction of one of a metal alkoxide precursor and a non-metal alkoxide or a combination thereof.

Examples of the metal alkoxide precursor include aluminate, titanium acid, and zirconate. Examples of the non-metal alkoxide include alkoxysilanes, alkoxyborates, and the like, such as tetramethoxysilane (TMOS) and tetraethoxysilane (TEOS).

Specific examples of the material of the mutual buffer film 18 of the present embodiment include TEOS, magnesium oxide, glass, resin, and phosphates such as zinc phosphate, calcium phosphate, and iron phosphate. The material of the mutual buffer film 18 of the present embodiment is preferably TEOS. Therefore, the withstand voltage can be further improved.

The average thickness (t) of the mutual buffer film 18 of the present embodiment is preferably larger than 0 nm and 70 nm or less, and more preferably 5 nm or more and 20 nm or less. The average thickness of the mutual buffer film 18 is preferably smaller than the average particle size of the small particles 16. The smaller the average thickness of the mutual buffer film 18, the higher the magnetic permeability tends to be, and the manufacturing cost can be reduced.

In the present embodiment, since the small particles 16 and the mutual buffer film 18 attached to the surfaces of the large particles 14 are difficult to peel off, the magnetic field concentration and the occurrence of the magnetic saturation can be further prevented, and the DC superimposition characteristic tends to be further improved.

Next, a method for covering the surfaces of the large particles 14 with the mutual buffer film 18 is not particularly limited, but examples thereof include the following. For example, the large particles 14 to which the small particles 16 are attached are immersed in a solution in which a compound or a precursor thereof that constitutes the mutual buffer film 18 is dissolved. Alternatively, the solution is sprayed onto the large particles 14 to which the small particles 16 are attached. Next, a heat treatment and the like are performed on the large particles 14 and the small particles 16 to which the solution is attached. Therefore, composite particles 12*a* in which the mutual buffer film 18 is formed on the large particles 14 and the small particles 16 shown in FIG. 4 can be obtained.

Specifically, the mutual buffer film 18 can be formed on the large particles 14 and the small particles 16 by the following method. First, the large particles 14 to which the small particles 16 are attached and a mutual buffer film raw material solution are mixed.

Here, the mutual buffer film raw material solution is a solution containing components constituting the mutual buffer film 18. In the present embodiment, for example, when the mutual buffer film 18 is TEOS, a solution containing TEOS, water, ethanol, and hydrochloric acid can be used as the mutual buffer film raw material solution.

A mixed solution of the large particles 14 to which the small particles 16 are attached and the mutual buffer film raw material solution is heated in a sealed pressure vessel, and a wet gel of TEOS is obtained by the sol-gel reaction. A heating temperature is not particularly limited, and is, for example, 20° C. to 80° C. A heating time is also not particularly limited, and is 5 hours to 10 hours. The wet gel of TEOS is further heated at 65° C. to 75° C. for 5 hours to 24 hours to obtain a dry gel, that is, the composite particles 12*a* shown in FIG. 4.

The average thickness of the mutual buffer film 18 can be adjusted by changing a reaction time between the large particles 14 and the mutual buffer film raw material solution, or by changing a concentration of TEOS in the mutual buffer film raw material solution.

As shown in FIG. 4, in the composite particles 12*a* according to the present embodiment, the small particles 16 having the average particle size smaller than that of the large particles 14 are directly or indirectly attached to the surfaces of the large particles 14. That is, the small particles 16 may be directly attached to the surfaces of the large particles 14; the small particles 16 may be indirectly attached to the surfaces of the large particles 14 via the mutual buffer film 18; or the other small particles 16 may be attached to the surfaces of the large particles 14 via one or more small particles 16.

In the present embodiment, the mutual buffer film 18 covers at least part of the surfaces of the large particles 14 located between the small particles 16 existing around the large particles 14. The mutual buffer film 18 may cover the surfaces of the large particles 14 located between the small particles 16 existing around the large particles 14, or may further cover surfaces of the small particles 16.

The core 6 can be manufactured in the same manner as in the first embodiment using the composite particles 12*a* thus obtained.

As shown in FIG. 4, since the surface of the large particle 14 is covered with the mutual buffer film 18, the small particles 16 on the surface of the large particle 14 can be prevented from moving along the surface of the large particle 14 during molding. Therefore, it is possible to increase certainty that the small particles 16 function as the spacers among the large particles 14 when molded at a high pressure. The mutual buffer film 18 of the present embodiment preferably continuously covers the surfaces of the large particles 14 and the small particles 16, but does not necessarily have to be continuous.

Third Embodiment

The present embodiment is the same as the second embodiment except for that as shown below. That is, in the second embodiment, TEOS is used as the mutual buffer film 18, but in the present embodiment, the mutual buffer film 18 is made of a resin. A method for forming the mutual buffer film 18 in the present embodiment is not particularly limited. An example of the method for forming the mutual buffer film 18 in the present embodiment is as follows.

The large particles 14 to which the small particles 16 are attached and a resin-soluble solution in which the resin is dissolved are mixed to generate a first solution.

Next, a resin-insoluble solution is added to the first solution to generate a second solution. Here, the resin-insoluble solution is a solution that is insoluble in the resin dissolved in the previous step and is soluble in the resin-soluble solution.

By adding the resin-insoluble solution to the first solution to generate the second solution, the resin-soluble solution dissolves in the resin-insoluble solution. Therefore, the resin dissolved in the resin-soluble solution can be precipitated as the mutual buffer film 18.

The second solution is then dried. As a result, the precipitated mutual buffer film 18 (resin) is attached to the surfaces of the large particles 14, and the composite particles 12*a* in which the mutual buffer film 18 (resin) is attached to the surfaces of the large particles 14 can be obtained.

Fourth Embodiment

The present embodiment is the same as the core 6 of the first embodiment except for that as shown below. Although not shown, the present embodiment includes a coating layer on at least a part of the surface of the large particles 14. In the present embodiment, the large particles 14 can be prevented from oxidation by including the coating layer in a process of manufacturing the core 6 shown in FIGS. 1 and 2. By including the coating layer, a non-magnetic and insulating layer can be imparted to the surface of the large particles 14, and therefore, magnetic characteristics (the DC superimposition characteristic and the withstand voltage) can be improved.

A material of the coating layer is not particularly limited, and examples thereof include TEOS, magnesium oxide, glass, resin, and phosphates such as zinc phosphate, calcium phosphate, and iron phosphate. The material of the coating layer is preferably TEOS. Therefore, the withstand voltage can be maintained higher.

The coating layer covering the surface of the large particles 14 may cover at least part of the surfaces of the large particles 14, but preferably covers the entire surface. Furthermore, the coating layer may continuously or intermittently cover the surface of the large particles 14.

Not all the large particles 14 include the coating layer. For example, 50% or more of the large particles 14 may include the coating layer.

When the large particles 14 include the coating layer as in the present embodiment, a value described as the average particle size (R) of the large particles 14 in the first embodiment is understood as including the coating layer in the particle size of the large particles 14.

Similarly, when the large particles 14 include the coating layer as in the present embodiment, the content described as D10 of the large particles 14 in the first embodiment is understood as including the coating layer in the particle size of the large particles 14.

A method for forming the coating layer on the surface of the large particles 14 is not particularly limited, and a known method can be adopted. For example, the coating layer can be formed by performing a wet treatment on the large particles 14.

Specifically, the large particles 14 are immersed in a solution in which a compound or a precursor thereof constituting the coating layer is dissolved, or the solution is sprayed onto the large particles 14. Next, a heat treatment and the like are performed on the large particles 14 to which the solution is attached. Therefore, the coating layer can be formed on the large particles 14.

Since the composite particles 12 of the present embodiment have the above-described configuration, even if the coating layer is peeled off or the coating layer is cracked due to the large particles coming into contact with each other and being compressed and deformed, it is difficult for the large particles 14 to come into contact with each other. This is because, as shown in FIG. 2, the core 6 has the spacer regions in which the small particles 16 smaller than the large particles 14 exist as the spacers between the large particles 14. Therefore, a predetermined distance can be created between the large particles 14, and the distance between the large particles 14 can be set to a certain level or more.

In this way, peeling and cracking of the insulating coating layer can be prevented. Therefore, it is possible to prevent the volume resistivity from decreasing and to improve the withstand voltage.

The coating layer functions as a non-magnetic layer to improve the DC superimposition characteristic. In the present embodiment, since the peeling and cracking of the coating layer can be prevented, the DC superimposition characteristic tends to be higher.

In the present embodiment, even if the peeling or cracking occur in the coating layer in a high temperature environment due to a difference in a linear expansion coefficient between the large particles 14 and the coating layer, since the distance between the large particles 14 can be set to a certain level or more by the small particles 16, it is possible to prevent a decrease in withstand voltage.

Although the embodiments of the present invention have been described above, the present invention is not limited to the above embodiments, and may be modified in various ways within a scope of the present invention.

For example, as the inductor element 2, a configuration in which the air-cored coil around which the conductor 5 is wound is embedded inside the core 6 having a predetermined shape as shown in FIG. 1 is shown above. However, a structure thereof is not particularly limited, and any structure may be used as long as the conductor is wound around the surface of the core having a predetermined shape.

Examples of the shape of the core include FT type, ET type, EI type, UU type, EE type, EER type, UI type, drum type, toroidal type, pot type, cup type, and the like.

Although the element body used for the core 6 has been described above, the element body of the present invention is not limited to the core 6, and can be used for other electronic components containing particles. For example, the element body can be used for electronic components formed using dielectric compositions and/or electrodes, a magnet containing a magnetic powder, and electrodes or magnetic shield sheets for lithium-ion batteries or all-solid-state batteries.

When the element body of the present embodiment is used as the dielectric compositions, examples of the material of the large particles 14 include barium titanate, calcium titanate, strontium titanate, and the like, and examples of the material of the small particles 16 include silicon, rare earth elements, alkaline earth metals, and the like.

When the element body of the present embodiment is used as the electrodes, examples of the material of the large particles 14 include Ni, Cu. Ag or Au, alloys thereof, carbon, and the like.

EXAMPLES

Hereinafter, the present invention will be described in more detail with reference to Examples, but the present invention is not limited to these Examples.

Comparative Example 1

A mutual buffer film raw material solution containing TEOS, water, ethanol, and hydrochloric acid was prepared and mixed with the large particles. The material of the large particles was Fe, and the average particle size thereof was 4000 nm.

The mixed solution of the large particles 14 and the mutual buffer film raw material solution was heated in a sealed pressure vessel to obtain a wet gel of TEOS. The heating temperature was 50° C. and the heating time was 8 hours. The wet gel of TEOS was further heated at approximately 100° C. for 1 week to obtain a dry gel.

The epoxy resin was weighed so that a solid content of the epoxy resin was 3 parts by mass with respect to 100 parts by mass of the dry gel thus obtained, and then the dry gel and the epoxy resin were mixed and stirred to generate particles.

The obtained particles were filled into a mold having a predetermined toroidal shape and pressed at a molding pressure as described in Table 1 to obtain an element body of a core. The obtained element body of the core was heat-cured in the atmosphere at 200° C. for 4 hours to obtain a toroidal core (outer diameter: 17 mm, inner diameter: 10 mm).

Samples were prepared by winding a copper wire around the toroidal core with 32 turns.

The initial magnetic permeability (μi) of the obtained samples was measured with an LCR meter (LCR428A manufactured by the HP). Results are shown in Table 1.

When a current was applied to the electric wire wound around the toroidal core, a change in magnetic permeability was measured. When the strength of the magnetic field increased as the current increased, the magnetic permeability gradually decreased, and the strength of the magnetic field when the initial magnetic permeability reached 80% was defined as the DC superimposition characteristic. Results are shown in Table 1.

The obtained samples were cut. A core 6 part of a cross section was observed with a scanning transmission electron microscope (STEM), and the number of the spacer regions 22 in the field of view within a predetermined range in which 10 or more and 40 or less large particles were observable was measured. Results are shown in Table 1. An average number of the small particles 16 existing as the spacers in the spacer regions of the above-mentioned predetermined range was measured. Results are shown in Table 1.

TABLE 1

| | Comparative Example 1 | | | | | | |
|---|---|---|---|---|---|---|---|
| Sample No. | 1 | 2 | 3 | 4 | 5 | 6 | 7 |
| Molding pressure [t/cm²] | 2 | 2 | 4 | 6 | 8 | 10 | 1.2 |
| Initial magnetic permeability (μi) | 8.48 | 10.09 | 11.61 | 13.93 | 16.09 | 18.25 | 20.50 |
| Initial magnetic permeability ×0.8 | 6.79 | 8.07 | 9.28 | 12.75 | 13.67 | 14.60 | 16.40 |
| DC superimposition characteristic [A/m] | 13356.4 | 10804.2 | 10361.5 | 9467.8 | 8574.0 | 8159.7 | 7785.0 |
| Number of spacer regions in predetermined field of view [number of locations] | 0 | 0 | 0 | 0 | 0 | 0 | 0 |
| Average number of small particles present as spacers in spacer regions | 0 | 0 | 0 | 0 | 0 | 0 | 0 |

Example 1

Samples were prepared in the same manner as in Comparative Example 1 except that the "large particles 14 of which the small particles 16 are attached to the surfaces by electrostatic adsorption" were used instead of the "large particles" and the mutual buffer film was not formed, and the initial magnetic permeability, DC superimposition characteristic, the number of the spacer regions 22 in the field of view within a predetermined range, and the number of the small particles 16 existing as the spacers in the spacer regions 22 were measured in the same manner as in Comparative Example 1. Results are shown in Table 2. The material of the small particles 16 was $SiO_2$, and the average particle size thereof was 100 nm.

TABLE 2

| | Example 1 | | | |
|---|---|---|---|---|
| Sample No. | 8 | 9 | 10 | 11 |
| Molding pressure [t/cm²] | 6 | 8 | 10 | 12 |
| Initial magnetic permeability (μi) | 16.70 | 18.64 | 19.70 | 21.50 |
| Initial magnetic permeability × 0.8 | 13.37 | 14.43 | 14.91 | 17.20 |
| DC superimposition characteristic [A/m] | 10000.0 | 9448.8 | 9192.6 | 8654.0 |
| Number of spacer regions in predetermined field of view [number of locations] | 1.0 | 5.0 | 7.0 | 10.0 |
| Average number of small particles present as spacers in spacer regions | 1 | 2 | 3 | 3 |

Example 2

Samples were prepared in the same manner as in Comparative Example 1 except that the "large particles 14 of which the small particles 16 are attached to the surfaces by electrostatic adsorption" were used instead of the "large particles", and the initial magnetic permeability, DC superimposition characteristic, the number of the spacer regions 22 in the field of view within a predetermined range, and the number of the small particles 16 existing as the spacers in the spacer regions 22 were measured in the same manner as in Comparative Example 1. Results are shown in Table 3. The material of the small particles 16 was $SiO_2$, and the average particle size thereof was 100 nm.

TABLE 3

| | Example 2 | | | |
|---|---|---|---|---|
| Sample No. | 12 | 13 | 14 | 15 |
| Molding pressure [t/cm$^2$] | 6 | 8 | 10 | 12 |
| Initial magnetic permeability (μi) | 10.36 | 11.08 | 12.41 | 15.30 |
| Initial magnetic permeability × 0.8 | 8.29 | 8.86 | 9.13 | 14.40 |
| DC superimposition characteristic [A/m] | 15754.5 | 14507.7 | 13671.5 | 10897.0 |
| Number of spacer regions in predetermined field of view [number of locations] | 3.0 | 7.0 | 12.0 | 15.0 |
| Average number of small particles present as spacers in spacer regions | 4 | 5 | 5 | 5 |

Comparative Example 2

Samples were prepared in the same manner as in Comparative Example 1 except that the mutual buffer film was not formed, and the initial magnetic permeability, DC superimposition characteristic, the number of the spacer regions 22 in the field of view within a predetermined range, and the number of the small particles 16 existing as the spacers in the spacer regions 22 were measured in the same manner as in Comparative Example 1. Results are shown in Table 4.

TABLE 4

| | Comparative Example 2 | | |
|---|---|---|---|
| Sample No. | 16 | 17 | 18 |
| Molding pressure [t/cm$^2$] | 6 | 8 | 10 |
| Initial magnetic permeability (μi) | 31.20 | 33.21 | 35.79 |
| Initial magnetic permeability × 0.8 | 24.96 | 26.56 | 28.63 |
| DC superimposition characteristic [A/m] | 5218.0 | 4904.0 | 4590.1 |
| Number of spacer regions in predetermined field of view [number of locations] | 0 | 0 | 0 |
| Average number of small particles present as spacers in spacer regions | 0 | 0 | 0 |

Figure 5:
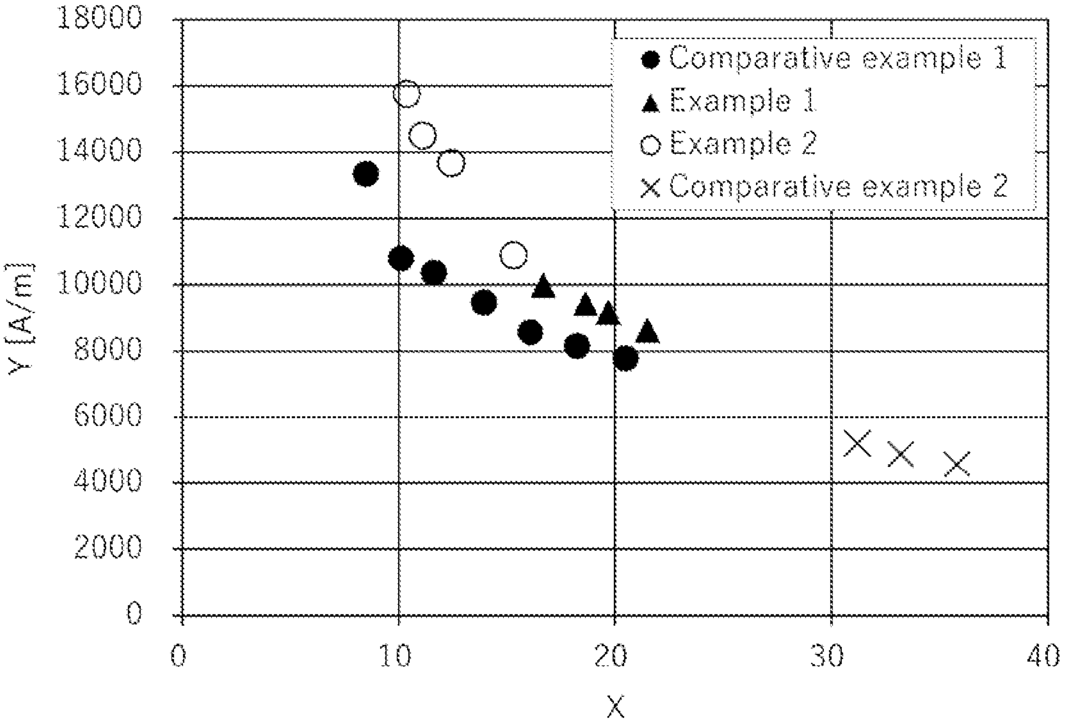
FIG. 5 is a graph relating to Comparative Example 1, Example 1, Example 2, and Comparative Example 2 of the present invention.

In FIG. 5, solid circle indicates Comparative Example 1, solid triangle indicates Example 1, hollow circle indicates Example 2, and cross indicates Comparative Example 2. In FIG. 5, a Y-axis indicates the DC superimposition characteristic, and an X-axis indicates the initial magnetic permeability (pi).

From Tables 1 to 4 and FIG. 5, when the number of the spacer regions 22 in the field of view within a predetermined range is one or more (Examples 1 and 2), the DC superimposition characteristic and the initial magnetic permeability were both confirmed to be high.

REFERENCE SIGNS LIST

2 inductor element
4 winding portion
5 conductor
6 core
6*a* central portion of core
12, 12*a* composite particle
14 large particle
16 small particle
18 mutual buffer film
20 resin
22 spacer region

What is claimed is:

1. A core comprising magnetic large particles, small particles, a resin binder, and four or five spacer regions in a predetermined range, wherein the small particles have an average particle size smaller than that of the magnetic large particles, the small particles exist as spacers to form the spacer regions between the magnetic large particles in a field of view within the predetermined range, the field view within the predetermined range is defined as a view where 10 or more and 40 or less of the large particles are observable in a cross section of the core, the spacer regions comprise the magnetic large particles in direct contact by surface to surface contact of intervening small particles without an intervening binder resin between the magnetic large particles, at least part of surfaces of the magnetic large particles located between the small particles existing around the magnetic large particles is covered with at least a mutual buffer film in the field of view within the predetermined range, the small particles are directly attached to the surfaces of the magnetic large particles, the mutual buffer film continuously covers the surfaces of the magnetic large particles and the small particles, a coverage of the small particles with respect to the large particle is 30% or more and 100% or less, the mutual buffer film comprises silicon oxide derived from tetraethoxysilane, a ratio t/r is larger than 0 and 0.7 or less, where r is the average particle size of the small particles and t is an average thickness of the mutual buffer film, the small particles are made of at least one selected from the group consisting of titanium oxide, aluminum oxide, magnesium oxide, zinc oxide, bismuth oxide, yttrium oxide, calcium oxide, silicon oxide, and ferrite, the core is formed with a molding pressure of 6-12 t/cm$^2$.

2. The core according to claim 1, wherein the small particles have a non-magnetic property and an insulating property.

3. The core according to claim 1, wherein the small particles comprise $SiO_2$ particles.

4. The core according to claim 1, wherein the mutual buffer film has a non-magnetic property and an insulating property.

5. The core according to claim 1, wherein the mutual buffer film is obtained by a sol-gel reaction of one of a metal alkoxide precursor and a non-metal alkoxide or a combination thereof.

6. An electronic component comprising the core according to claim 1.

7. The core according to claim 1, wherein t is in a range of more than 0 nm and 70 nm or less.

* * * * *